Dec. 3, 1968   E. SNITZER   3,414,837
PLURAL FIBER OPTIC LASER CONSTRUCTION
Filed Dec. 18, 1963

TIME (IN MICROSECONDS)

INVENTOR
ELIAS SNITZER
BY
ATTORNEY

United States Patent Office 3,414,837
Patented Dec. 3, 1968

---

3,414,837
PLURAL FIBER OPTIC LASER CONSTRUCTION
Elias Snitzer, Sturbridge, Mass., assignor to American Optical Company, Southbridge, Mass., a voluntary association of Massachusetts
Filed Dec. 18, 1963, Ser. No. 331,540
4 Claims. (Cl. 331—94.5)

ABSTRACT OF THE DISCLOSURE

Laser structure comprising large plurality of similar thin, long fiber elements of solid laser material in side-by-side bunched relation but separated by lower index cladding material for providing a laser energy output beam of more uniform conditions. Absorbing means may be included for increasing output efficiencies.

---

This invention relates to improvements in laser constructions and the like and more particularly to laser constructions or devices adapted and arranged to provide more nearly uniform power output conditions during laser emission than has been possible heretofore with earlier known forms of laser devices.

In attempting to use earlier forms of laser constructions for certain selected purposes, such as for the welding together of metals, or the like, difficulties have been encountered due at least in part to the fact that too high power output conditions have often been experienced. For example, when an ordinary ruby laser was optically pumped for pulsed operation, and even though each pulse was of short duration, it was found that holes would be, in effect, "burned" or "blown" through the metal; and even that some of the metal would be vaporized before a satisfactory melting and flowing of sufficient amounts of the metal could be effected for properly forming the weld.

When the instantaneous intensities of the power output for such laser operations as a function of time were measured or analyzed, as by the use of an oscilloscope trace, it was found that the output energy consisted of a series of very short duration high intensity pulses of emitted energy and that these very sharp "peaking" or "spiking" conditions insofar as welding operations, and the like, were concerned were undesirable.

It has now been found, however, that by following the teachings of the present invention, an improved laser device or laser construction for generating a more nearly uniform power output condition during laser emission, for welding purposes or the like, can be provided. The improved construction, in fact, is accomplished by the use of a fused-together or a secured-together bundle of thin elongated optical laser elements each comprising a core formed of a suitable laser material, such as a laser glass, a laser plastic, or a laser crystal of predetermined refractive index and surrounded by a suitable transparent cladding material such as glass or a plastic of a lower refractive index, and after which the entire assembly is properly conditioned so as to form the improved laser device or laser construction. At times it may be that the laser glass and the laser plastic materials will be preferable in view of the fact that they may be more readily shaped or fabricated; and, furthermore, as between these two laser materials, at times, it may be that the laser glass will be preferred largely because of its ability to withstand higher operating temperatures.

Accordingly, it is a principal object of the invention to provide a laser device or laser construction, for welding purposes, medical surgery, Schlieren photography or the like, formed by a fused-together or secured-together bundle of optical laser elements each formed by a relatively thin elongated core of laser material such as a laser glass, laser plastic, or a laser crystal of predetermined refractive index and coated by a suitable workable cladding material of predetermined lower index such as a glass or a plastic of proper optical and physical properties, said bundle including a very large number of such elements in generally parallel side-by-side relation to each other and all of said elements being of very nearly the same optical and physical characteristics and all of said elements, and at least one end of said bundle, being similarly optically finished so as to form a laser emission exit area of good quality and of the cross-sectional size desired.

It is also an object of the invention to provide in such an improved laser construction as mentioned above means for absorbing optical energy which passes from within the individual cores of laser material into the claddings and which might otherwise tend to lessen the output power of the laser construction.

Other objects and advantages of the invention will become apparent from the detailed description which follows when taken in conjunction with the accompanying drawing wherein.

Figure 1:
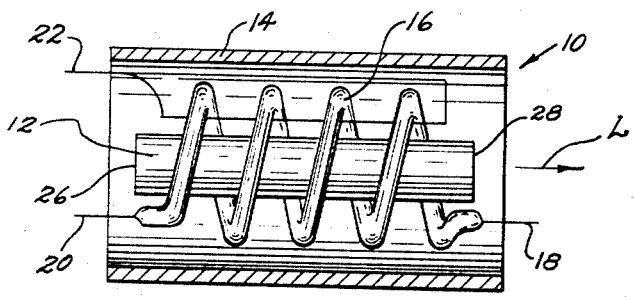
FIG. 1 is a longitudinal view, partly in section, of a laser assembly including a laser construction or device embodying the present invention.

Referring to the drawings in detail and in particular to FIG. 1, it will be seen that a laser welding assembly is indicated generally by the numeral 10 and comprises a laser member 12 centrally disposed within a highly polished or plated cylindrically-shaped reflector 14. A spirally shaped flash tube 16 of known construction is shown within the reflector and is arranged in concentric encircling relation relative to the laser member. Electrical connections for the flash tube are shown at 18 and 20 and a high potential triggering circuit is indicated at 22.

Figure 2:
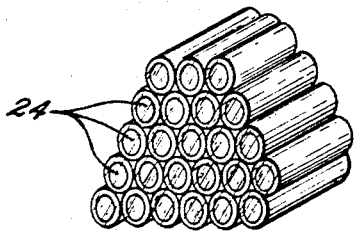
FIG. 2 is an enlarged fragmentary perspective view of an end portion of an optical laser device such as might be employed in the assembly of FIG. 1.

When the laser member 12 is considered in greater detail, however, it will be seen, as indicated in FIG. 2 wherein a greatly enlarged fragmentary portion of one end of the laser member is shown, that this member is, in fact, formed by a very large number of thin elongated rod-like or fiber-like optical elements 24. These elements are preferably arranged and secured in generally parallel compactly bunched side-by-side relation so as to form a bundle of desired cross-sectional size; and such an assembly may have from a few hundred rod-like elements to as many as $10^8$, or more, fiber-like elements per square centimeter as desired.

The opposite ends of the bundle are preferably ground and polished and then, as indicated at 26, one end is coated with silver or other suitable reflective material so as to be highly reflective while the opposite end 28 may be left uncoated or only partially coated by a reflective material so as to reflect part of the energy and transmit part, whereby stimulated laser energy will be emitted therefrom as indicated by arrow L.

Figure 3:
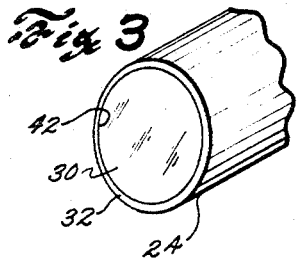
FIG. 3 is a greatly enlarged perspective view of an end portion of a single optical laser element such as might be used in the formation of the optical bundle of FIG. 2.

As shown in the enlargement in FIG. 3, each laser element 24 may be formed by a core 30 of transparent laser glass, or laser plastic or laser crystal of a predetermined refractive index surrounded by a thin cladding 32 of a transparent glass or transparent plastic (as the case may be) of a lower predetermined refractive index disposed in intimate optical contact with the smooth side walls of the core. When such is the case, a totally internally reflecting interface 42 between the core and cladding will be effected and by the proper selection of materials of different related refractive indices, a control of the emission characteristics of the rod-like or fiber-like elements can be obtained.

While several different laser glasses for forming the core 30 are known, a trivalent neodymium doped barium crown glass is preferred, and various different amounts between approximately 0.01% and 20% by weight of neodymium can be used as the active ingredient in the core glass. A commercially available clear soda-lime crown glass could be used satisfactorily as the cladding material for the laser glass. Other known laser glasses are trivalent ytterbium doped glasses and trivalent holmium doped glasses. While glass coated glass elements might more often be preferred, it would, nevertheless, be possible to use a clear plastic, such as a methyl methacrylate doped with an europium chelate or the like as the core material, and a clear plastic of a lower refractive index would be used as the surrounding cladding material therewith. Also, a number of crystalline laser materials, such as ruby, uranium in calcium fluoride and praseodymium in calcium tungstate.

Figure 6:
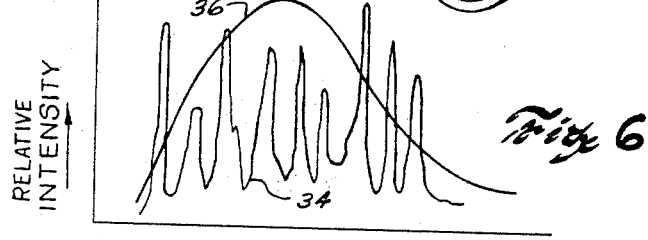
FIG. 6 is a chart showing power output curves for use in describing the invention.

When a laser rod of conventional construction was caused to go into laser oscillation a many-spiked time trace was obtained. In fact, this trace had somewhat of the pattern indicated at 34 in FIG. 6, wherein an intensity v. time oscilloscope trace chart has been presented. On the other hand, when a bundle of laser elements was optically pumped and caused to go into laser oscillation, a trace very much like the pattern indicated at 36 was obtained.

It is believed that the much more desirable time trace obtained by laser bundles embodying the present invention wherein a better melting and flowing of metal for welding purposes can be obtained, is due largely to the fact that while all of the many fiber-like or rod-like elements of a single bundle are substantially alike, they, nevertheless, infinitesimally differ somewhat with the result that they manifest their own laser oscillation characteristics separately. However, when their combined output is being considered as herein, they provide the much more nearly evenly averaged power output condition desired.

Figure 4:
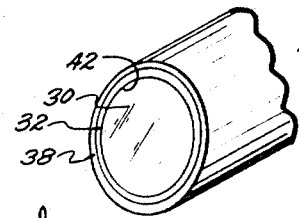
FIG. 4 is a greatly enlarged perspective view of a modified form of optical laser element such as might be used in the forming of the bundle of FIG. 2.

In FIG. 4 is shown a modified construction of rod-like or fiber-like laser element which can be used to good advantage when desired. This construction employs, besides the laser core 30 and clear lower index cladding 32 for each element, an outer selectively absorbing cladding 38 of glass or plastic as the construction may require. Such an outer selectively absorbing cladding would preferably be formed of a material which provided good transmission of optical energy at the pumping wavelengths for the core material to be lasered but which would, nevertheless, be a good absorber of optical energy at the laser emission wavelength. Materials which could be used for such selectively absorbing purposes in conjunction with a neodymium glass laser core, for example, would include divalent iron containing glasses, trivalent samarium doped glasses and trivalent dysprosium doped glasses.

Figure 5:
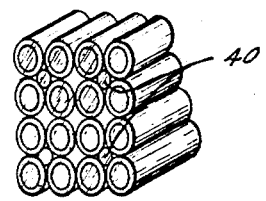
FIG. 5 is an enlarged fragmentary perspective view of an end portion of a modified form of optical laser device such as might be used in the assembly of FIG. 1.

In FIG. 5 is shown a slightly different laser bundle construction which is in all respects like that shown in FIG. 2 except that dispersed among the coated laser elements are, as indicated at 40, a number of smaller rods or fibers formed of any one of the selectively absorbing materials mentioned above.

Thus, when pumping optical energy is being used to cause laser oscillation in a laser construction employing the modified arrangements of FIGS. 4 and 5, any optical energy which passes from within the core 30 of an element through the optical interface 42 and into the clear cladding of the element will then be absorbed in the case of the FIG. 4 construction by second selectively absorbing cladding 38 and, in the case of the FIG. 5 construction, by the selectively absorbing smaller rods of fibers 40.

Having described my invention, I claim:

1. A laser construction for generating a high intensity emission beam comparatively free from excessively high energy peaking conditions of very short duration at all times during each period of operation thereof, said construction comprising a very large number of relatively thin, elongated substantially similar fiber optical elements secured together in side-by-side generally parallel bunched relation to each other so as to form a fiber optical bundle of predetermined length and cross-sectional size, each of said thin, elongated fiber optical elements comprising a relatively thin, elongated core, and cladding means in surrounding contacting relation with the side wall portions of said core throughout the length thereof, each core being formed of a solid transparent dielectric laser material of a predetermined refractive index, the cladding means surrounding each core being formed of a solid dielectric material which is transparent to optical energy at the pumping wavelengths of said laser material, is of a lesser predetermined refractive index than that of said laser material and is of such thickness and optical properties as to substantially optically isolate each core from adjacent cores of said bundle, said bundle having the fiber optical elements thereof, at its opposite ends, optically finished, and reflecting means so disposed adjacent each end of said bundle as to include said fiber optical bundle therebetween and arranged in such relation to each other as to reflect light rays back and forth therebetween, the reflecting means adjacent at least one end of said bundle being slightly transmissive so as to allow optical energy at laser emission wavelength to pass outwardly therethrough.

2. A laser construction as defined in claim 1 wherein said cladding means includes a selectively absorbing material which is transparent to optical energy at the pumping wavelength of said laser material but is absorptive of optical energy at the emission wavelength of said laser material.

3. A laser construction as defined in claim 1 wherein said cladding means comprises a first coating of clear transparent dielectric material in contacting relation with said core and a second coating of selectively absorbing dielectric material surrounding said first coating, said second coating being transparent to optical energy at the pumping wavelength of said laser material and being absorptive of optical energy at the emission wavelength of said laser material.

4. A laser construction as defined in claim 1 wherein a plurality of thin elongated elements of smaller cross-sectional size than the optical elements of said bundle and of selectively absorbing material are disposed among said optical elements at selected locations and arranged to extend in parallel relation to the fiber optical elements thereof, said selectively absorbing material of said smaller elements being highly absorptive of optical energy at the emission wavelength of said laser material.

(References on following page)

References Cited

UNITED STATES PATENTS

| | | | |
|---|---|---|---|
| 3,242,440 | 3/1966 | Koester et al. | 331—94.5 |
| 3,247,756 | 4/1966 | Siegmund | 88—1 |
| 3,253,500 | 5/1966 | Hicks | 88—1 |

FOREIGN PATENTS 1,158,172  11/1963  Germany.

OTHER REFERENCES

E. Snitzer, Physical Review Letters, vol. 7, No. 12, Dec. 15, 1961, pp. 444–446.

Electronics Preview, July 1962, p. 4.

DAVID SCHONBERG, *Primary Examiner.*

P. R. MILLER, *Assistant Examiner.*